United States Patent [19]

Ide

[11] Patent Number: 5,447,472
[45] Date of Patent: Sep. 5, 1995

[54] ARTICULATED COUPLING FOR USE WITH A PROGRESSIVE CAVITY APPARATUS

[76] Inventor: Russell D. Ide, 122 Ridge Dr., Exeter, R.I. 02822

[21] Appl. No.: 96,006

[22] Filed: Jul. 23, 1993

[51] Int. Cl.⁶ .......................... E21B 4/02; F16D 3/50
[52] U.S. Cl. ..................................... 464/20; 175/107; 464/89; 464/147
[58] Field of Search ..................... 464/18, 20, 89, 147; 175/107

[56] References Cited

U.S. PATENT DOCUMENTS

| | | | |
|---|---|---|---|
| 2,028,407 | 1/1936 | Moineau . | |
| 2,620,163 | 12/1952 | Cricker | 464/20 |
| 3,156,106 | 11/1964 | Crane | 464/20 |
| 3,323,326 | 6/1967 | Vertson | 464/20 |
| 3,627,453 | 12/1971 | Clark . | |
| 4,080,115 | 3/1978 | Sims et al. | 175/107 |
| 4,913,411 | 4/1990 | Collins et al. | 464/89 |
| 5,007,490 | 4/1991 | Ide | 175/107 |
| 5,007,491 | 4/1991 | Ide | 175/107 |
| 5,135,060 | 8/1992 | Ide | 175/107 |

Primary Examiner—Daniel P. Stodola
Assistant Examiner—Eileen A. Dunn
Attorney, Agent, or Firm—Michael D. Bednarek; Marks & Murase

[57] ABSTRACT

A progressive cavity device including an articulate coupling for converting the complex motion of the rotor into simple rotation. The coupling includes two shafts coupled to one another by joint assemblies connected to opposite ends of an intermediate shaft. The joint assemblies include interlocked threaded portions and an elastomer filling the spaces between the threaded portions. Under loading the male and female portion move relative to one another so that the elastomer is subject to both compression and shear. Should the elastomer fail, the threaded portions simply lock together thereby allowing fail safe operation. The moving components within the coupling are perfectly isolated from the surrounding environment.

20 Claims, 4 Drawing Sheets

ARTICULATED COUPLING FOR USE WITH A PROGRESSIVE CAVITY APPARATUS

SUMMARY OF THE INVENTION

This invention relates to an articulated coupling which is preferably used in conjunction with a progressive cavity apparatus, and, more particularly, to a fail safe articulated coupling which includes joints which are flexible enough to couple the orbiting rotor of the progressive cavity apparatus to a rotating shaft while transmitting the thrust and torque loads typically experienced when operating a progressive cavity apparatus down hole.

BACKGROUND OF THE INVENTION

The use of progressive cavity or single-screw rotor devices is well known in the art, both as pumps and as driving motors. These devices have a single shaft in the shape of one or more helix contained within the cavity of a flexible lining of a housing. The generating axis of the helix constitutes the true center of the shaft. Typically, the lined cavity is in the shape of a two or more helices (one more helix than the shaft) with twice the pitch length of the shaft helix. Either the shaft or the housing is secured to prevent rotation; the part remaining unsecured rolls with respect to the secured part. As used herein, rolling means the normal motion of the unsecured part of progressive cavity devices. In so rolling, the shaft and housing form a series of sealed cavities which are 180 degrees apart. As one cavity increases in volume, its counterpart cavity decreases in volume at exactly the same rate. The sum of the two volumes is therefore a constant.

Examples of progressive cavity motor and pump devices are well known in the art. The construction and operation of such devices may be readily seen in U.S. Pat. Nos. 3,627,453 to Clark (1971); 2,028,407 to Moineau (1936); 1,892,217 to Moineau (1932) and 4,080,115 to Sims et al. (1978).

When used as a pump, the unsecured part is caused to roll by a rotating driving shaft coupled to the unsecured part by an articulated coupling. This causes the sealed cavities to move axially in a way which can be used to forcefully pump fluids. Progressive cavity or Moyno pumps are used in a variety of applications. In the past, however, such pumps have not been successfully used downhole because of the difficulty in finding a suitable coupling and because most downhole pumping is done with centrifugal pumps, not downhole pumps. There are, however, applications where a progressive cavity pump might be used downhole to pump oil especially heavy crude oil which is very viscous. The coupling of the present invention is well suited for such applications.

When used as a motor for downhole drilling, high pressure fluid is forced into the progressive cavity device and the unsecured part or rotor produces a rotor driving motion. The driving motion of the rotor is quite complex in that it is simultaneously rotating and moving transversely with respect to the stator. One complete rotation of the rotor will result in a movement of the rotor from one side of the stator to the other side and back. The true center of the rotor will of course rotate with the rotor. However, in a typical construction, the rotation of the true center of the rotor traces a circle progressing in the opposite direction to the rotation of the rotor, but with the same speed (i.e., reverse orbit). One complete rotation of the rotor will result in one complete rotation of the true center of the rotor in the opposite direction. Thus, the rotor driving motion is simultaneously a rotation, an oscillation, and a reverse orbit. For multi-lobe motors the reverse orbit is a multiple of the rotational speed, e.g., if a three lobe motor is used the reverse orbit is three times as great as the rotational speed.

The present invention is also applicable to progressive cavity motors used in directional drilling. Among the most common directional drilling techniques is the use of downhole drilling motors in combination with a bent sub. The bent sub is a section of drill pipe manufactured with a slight angle that is installed in the drill string above the bit. The built-in angle of the sub exerts a side force on the bit and causes it to be deflected from the previous direction of the hole. Bent subs typically provide deflections ranging from near zero to 5°. Thus, the drill shaft must be capable of bending or articulating so that the downhole motor can pass the bend in the drill pipe. Typically, either turbine-type or progressive cavity downhole motors are used. However, it is also possible to use an electric motor in some cases.

The use of progressive cavity devices as pumps or motors downhole introduces additional problems. Specifically, despite the simple construction of progressive cavity devices, the extreme conditions experienced downhole lead to problems. These problems result primarily from the failure to provide a drive train capable of handling the complex rotor driving motion (described above) in a durable, reliable and inexpensive manner. Couplings that connect the rotor of progressive cavity pumps or motors with the pump driving shaft or drill driven shaft must be capable of operating in a contaminated, hostile environment while handling a very high torque and transmitting the rotational output of the rotor without the orbital motion of the rotor (in the case of motors) and converting simple rotation into orbiting of the rotor (in the case of pumps). Failure of the couplings can result in equipment being lost downhole.

Of the couplings which have been used in progressive cavity devices, the most commercially successful has been a universal joint attached to the driving end of the rotor and connected to a universal joint attached to the driven drill shaft. As is known, such U-joints react or resolve the orbital motion by the sliding of pin members in a universal assembly. Thus, such joints typically include elements which slide relative to one another.

Figure 3:
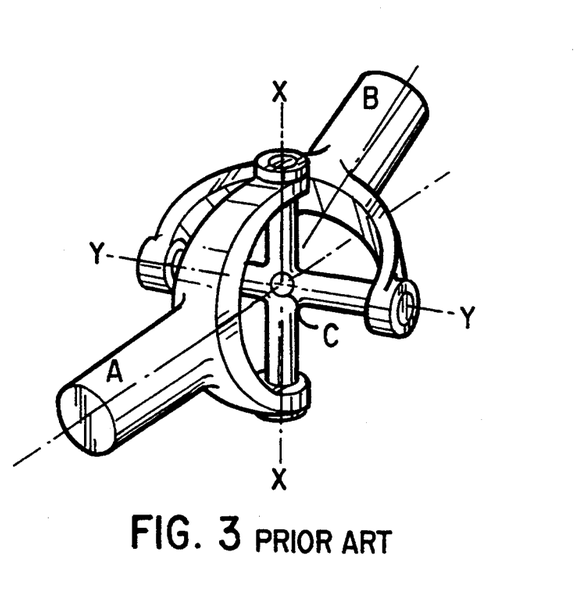
FIG. 3 is a perspective view of a conventional universal joint assembly.

The principle on which the Hooke's type of universal assembly works is illustrated in FIG. 3. The shaft A is formed into a fork or yoke at its end and pivoted between the prongs of this fork is a cross-piece C. The cross-piece C can therefore pivot about the XX relatively to the shaft A. The other shaft B similarly includes a fork or yoke at its end and the other arms of the cross are pivoted between the prongs of this fork. The shaft B can therefore pivot about the axis YY relative to the cross C and, since the latter can pivot about the axis XX relative to the shaft A, the shaft B can assume any angular position relative to shaft A. It follows that if the shafts A and B are supported in bearings with their axes at an angle, then when the shaft A is turned about its axis, the motion is communicated to the shaft B and it turns about its axis; the arms of the cross meanwhile oscillating in the prongs of the forks.

The axes XX and YY intersect at O and are perpendicular to one another. The axes of the arms of the cross C are also perpendicular to their respective shafts. The axes of the shafts A and B also intersect at O, which point is commonly referred to as the "center" of the joint.

Although FIG. 3 shows a specific pivoting connection, it does not matter how the pivoting action is obtained. All that is required is that the shaft B shall be able to pivot independently about two intersecting perpendicular axes such as XX and YY, relatively to shaft A. There are many known constructions for achieving this result.

The single Hooke's type of universal assembly described above suffers from a disadvantage which is obviated in some other forms of the joint. Specifically, when two shafts are connected by a single Hooke's joint and one of these shafts is rotating at an absolutely constant speed, then the other shaft will not rotate at a constant speed but at a speed that is, during two parts of each revolution, slightly greater and, during the other two parts of the revolution, slightly less than the constant speed of the first shaft, i.e., the velocity varies cyclicly. The magnitude of this fluctuation in speed depends on the angle between the axes of the two shafts, being 0 when that angle is 0° but becoming considerable when the angle is large. This disadvantage becomes of practical importance in applications such as downhole drilling when it is important to maintain a constant or substantially constant speed. The disadvantage can be obviated by using two Hooke's joints arranged with an intermediate shaft arranged so that it makes equal angles between the first and second stub shafts and the pivot axes of the intermediate shaft being arranged parallel to each other. The irregularity introduced by one joint is then cancelled out by the equal and opposite irregularity introduced by the second joint.

While the coupling of the present invention is particularly well suited to a submersible pump used downhole, this application has not been used. Thus, it is believed that the difficulty experienced with couplings downhole can best be appreciated by reference to downhole motors which are, of course, well known.

Attempts to apply universal joints to downhole motors have suffered from several disadvantages, particularly in the area of reliability. The primary reason for this is that the fluids used in progressive cavity drilling apparatus often are or quickly become abrasive. This abrasive fluid flows between the relative moving (sliding) surfaces of the U-joint causing rapid wear.

In the past, there have been attempts to isolate the sliding pivot surfaces of a universal from contaminants or heavy vibrations. Examples of such constructions are shown in U.S. Pat. Nos. 2,727,370 to Holland; 3,262,284 to Maxwell-Holroyd; 3,545,232 to Neese et al.; and 4,861,314 to Mazziotti. However, in such known cases there is always sliding between the seal and one of the surfaces of the U-joint components. As a result of this sliding, the seal is not truly hermetic and the U-joint components are not perfectly isolated. Thus, the possibility of contamination exists, particularly in a high pressure application such as down hole drilling.

Another type of universal joint assembly for use in downhole motor drives is disclosed in U.S. Pat. No. 4,772,246 to Wenzel. This patent discloses a pressure equalization arrangement which significantly reduces the pressure differential across the seal. As a result, the likelihood of leakage of drilling mud into the universal joint is reduced. Despite the advantages it offers, this construction is complicated and expensive. Further, the U-joint components are not perfectly isolated because the seal is not hermetic. Consequently, there is some possibility of contamination of the U-joint assembly. Thus, while the need to seal, to some extent, the components of a U-joint has been recognized, the need to perfectly isolate these components and a reliable means of achieving this are not known in the prior art.

These problems are addressed in the present inventor's previous U.S. Pat. No. 5,007,490 entitled "Progressive Cavity Drive Train With Elastomeric Joint Assembly For Use in Downhole Drilling", U.S. Pat. No. 5,007,491 entitled "Downhole Drilling Apparatus Progressive Cavity Drive Train with Sealed Coupling" and U.S. Pat. No. 5,048,622 entitled "Hermetically Sealed Progressive Cavity Drive Train For Use In Downhole Drilling." The aforementioned U.S. Pat. No. 5,007,490 discloses, among other things, a joint assembly in which load is transmitted through an elastomer.

While a well sealed double universal joint is suitable for use downhole it is not necessarily ideal. There are very specific requirements for the coupling used downhole. An ideal coupling meets this requirement without sacrificing durability. An important factor to consider is that the coupling does not have to be terribly flexible. In normal use the coupling undergoes 3° to 4° deflection and thus, need not deflect more than 5°. Thus, the flexibility offered by universal joints really isn't needed. In some cases a relatively thin shaft, i.e., a flexible shaft, can bend the necessary 5° without a coupling. However, there are other requirements.

Couplings used downhole typically must be capable of transmitting enormous thrust and torque forces. For example, in a medium sized mud motor, the shaft must be capable of reliably transmitting a thrust load of 20,000 lbs. and a torque of 60,000 inch pounds. In the case of submersible pumps, extremely viscous fluids such as heavy crude oil, are particularly difficult to pump. Conventional couplings are not capable of accommodating such loads for sustained periods.

The present inventors previous U.S. Pat. No. 5,135,060 addressed these problems by providing an articulated coupling which includes two distinct sections. The first is a torque transmitting section capable of transmitting the necessary torque but transmitting no thrust load. The second section is a thrust transmitting section capable of transmitting the necessary thrust but incapable of transmitting any torque. The thrust transmitting section and the torque transmitting section are both capable of bending as necessary to accommodate directional drilling.

A final consideration in the selection of couplings for use downhole is the need for a coupling which is fail safe. Since the coupling is used deep beneath the earth's surface failure of the coupling can be extraordinarly expensive, if not catastrophic. At a minimum, it is desirable that the coupling maintain the connection between components even when excessive loads are transmitted.

Thus, there remains a need, however, for an articulated coupling which can provide fail safe coupling, transmit high torque and still have a diameter small enough to be inserted down the well casing.

SUMMARY OF THE INVENTION

The present invention relates to an improved coupling for use in a progressive cavity apparatus, either as a motor or as a pump. When used as a motor, the progressive cavity device is connected to the lower end of the drill string and includes a stator, a rotor within the stator, and means for flowing fluids through the stator to drive the rotor. When used as a pump, the device includes a means such as an electric motor or rotating drive shaft for causing the rotor to roll within the stator.

The coupling has a first stub shaft, a second stub shaft and intermediate shaft and a pair of elastomeric helical joint assemblies. The intermediate shaft is coupled, via the joint assemblies, to the first stub shaft at one end and the second stub shaft at the other end. The connection of the shafts via the elastomeric joint assemblies is such that the coupling functions somewhat like a double Hooke's joint.

When used in a drill motor, the drill bit has a tubular housing connected to the second end of the second stub shaft for rotation with the second stub shaft. The coupling converts the complex rotor motion into rotational drilling motion about an axis displaced from and parallel to said rotor axis.

When used as a pump, the rotation of one end of the coupling leads to rolling of the other end within the cavity. Typically the other end is the rotor or unsecured portion of the progressive cavity apparatus. Consequently, rotation of one end of the coupling, such as by an electric motor, results in an axial progression of sealed cavities which can be used to pump liquids, even a viscous liquid such as heavy crude oil.

The present invention obviates the problems associated with known progressive cavity devices by providing a progressive cavity drive train including a progressive cavity device and a hermetically sealed coupling which converts the complex motion of the rotor into simple rotation of the drill shaft or vice versa, in the case of pumps. The drive train is inexpensive, reliable and durable in comparison to known progressive cavity drive trains.

The progressive cavity drive train includes a housing structure, a stator having a longitudinal axis, a rotor having a true center and being located within the stator, first and second stub shafts and an intermediate shaft coupling the stub shafts through sealed elastomeric helical joint assemblies in a universal type fashion.

The stator and the rotor have coacting helical lobes in contact with one another at any transverse section. The stator has one more helical lobe than the rotor such that a plurality of cavities are defined between the rotor and the stator. The rotor is adapted to rotate within the stator such that the true center of the rotor orbits the axis of the stator; the orbit has a predetermined radius. The orbit is constant and not subject to change such that the rotor motion can be precisely controlled. The orbit of the rotor causes progression of the cavities in the direction of the axis of the stator.

The first stub shaft has a longitudinal axis and first and second longitudinal ends. The first end of the first stub shaft is connected to and movable with the rotor. The second end of the first stub shaft is formed into a portion or directly connected to a portion of an elastomeric joint assembly.

The second stub shaft has a longitudinal axis which is substantially colinear with the axis of the stator and first and second longitudinal ends. The second stub shaft is supported in the housing so that its longitudinal axis is fixed and the second stub shaft is rotatable about its longitudinal axis. The second end of the second stub shaft is formed into a portion of or directly connected to a portion of an elastomeric joint assembly.

The intermediate shaft member is formed into or directly connected to a portion of a joint assembly at each end thereof. In this way, the intermediate shaft is coupled, through the elastomeric helical joint assemblies, to the first stub shaft at one end and the second stub shaft at the other end such that the first, intermediate and second shafts are pivotally connected to one another via the joint assemblies in a manner similar to that of a double Hooke's joint.

By virtue of this construction, the first stub shaft can rotate about its axis and orbit about the axis of the second stub shaft at the same time the second stub shaft rotates about its longitudinal axis. In this way, the complex rotor motion is resolved into simple rotation for driving the drill assembly of a downhole drill or, in the case of a pump, simple rotation can be used to cause the rotor to roll within the stator.

As described above, the drive train of the present invention includes a progressive cavity device and a sealed coupling. The progressive cavity device includes the stator, the cavity within the stator, the rotor within the stator cavity, and a passageway through which fluids may flow. The sealed coupling includes the offset stub shafts, the intermediate shaft and the joint assemblies coupling the stub shafts.

In operation as a motor, flow of fluids through the stator cavity produces the complex rotor driving motion. The sealed coupling is secured to the end of the rotor projecting from the fluid discharge end of the stator. The coupling converts or resolves the rolling of the rotor into a rotational motion substantially about a single axis at the same or similar speed.

When used as a pump, rotation of the driving shaft is transmitted through the coupling to the rotor causing the rotor to roll. The orbiting of the rotor causes a progression of cavities which can be used for pumping in the manner of a Moyno pump.

The present inventor has found that couplings, when used downhole, are most reliable when the sliding components of the joint are isolated from the surrounding environment. Further, the present inventor has discovered that, despite the relative movement between coupling components, it is possible to perfectly isolate or hermetically seal the relatively moving surfaces in a coupling used in a progressive cavity downhole drilling drive train. In part, the present invention results from the present inventor's recognition that universal joints can be designed to resolve the complex motion of a downhole progressive cavity drive train without large angular deviations between adjacent shafts in the universal assembly. In fact, by making the coupling sufficiently long, the rotor motion can be resolved by a coupling without skewing the shaft portions by more than 5°. This means that, in a coupling for a downhole drilling or pumping assembly, the amount of movement between the relatively movable portions is normally less than 0.05 inches. It follows that couplings specifically designed for use in downhole progressive cavity devices do not need to have the flexibility typically required of universal type couplings. Recognizing this has enabled the present inventor to design a coupling with limited, but sufficient, flexibility and perfectly isolated sliding components. The design of the present invention also has exceptionally high torque transmitting characteristics.

Thus, the present invention relates to a progressive cavity drive train in which the complex rotor motion is resolved by a coupling (preferably having elastomeric joint assemblies, at each end of the coupling) which is modified such that the moving surfaces within the joint assembly are perfectly isolated. Moreover, the joint assemblies have a fail safe construction.

The joint assembly includes longitudinally arranged male and female threaded portions or sections. The male and female portions are threaded together to interlock with one another, but are dimensioned such that a tortuous helical space remains between the interlocked portions. The space between the male and female is entirely filled with an elastomer. The elastomer is bonded to the male and female threaded portions.

By virtue of this structure the elastomer is highly restrained by the interlocked threading. Consequently, the elastomer is only slightly compressible in the longitudinal direction and somewhat more compressible in response to rotation because of the continuous helical nature of the elastomeric portion. By virtue of the elastomer connection between the longitudinally arranged joint portions, these portions are pivotable with respect to one another in all directions to a limited, but sufficient, degree. Consequently, the coupling is flexible. Since torsional loads are transmitted by shear through the entire helical length, the torsional load capacity is greatly increased. Thus, an important aspect of the present invention is provision of a joint assembly with improved torsional capacity. Further, because the relatively moving surfaces are completely isolated from the surrounding environment by virtue of the elastomer, there is no risk that abrasives will not enter between the relatively moving surfaces of the respective joint portions. Moreover, the structure is fail safe since the male and female portions will simply thread together in the event of completed or partial failure of the elastomer.

BRIEF DESCRIPTION OF THE DRAWINGS

Other objects, features, and advantages of the present invention are hereinafter set forth and explained with reference to the drawings wherein.

DETAILED DESCRIPTION OF THE DRAWINGS

The present invention contemplates an improved drive train having a more reliable high torque coupling. The coupling disclosed hereinafter is generally applicable to applications in which only limited flexibility is required, but performance demands (e.g., torque capacity) and operating conditions are extremely demanding. The most obvious example is downhole drilling and pumping using progressive cavity devices. With that understanding, the invention will be described in the context of downhole drilling. The invention is also particularly well suited to use in a downhole progressive cavity pump or applications with similar demands. The use of progressive cavity pumps is well known and the application of the coupling of the present invention to a progressive cavity pump should be readily understood in view of the following description.

Figure 1:
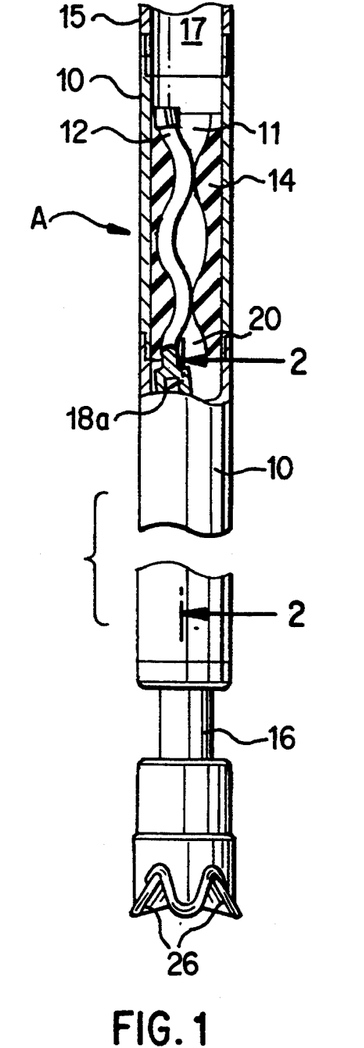
FIG. 1 is an elevation view partly in section of the overall structure of a downhole drilling apparatus of the type in which the coupling of the present invention may be used.

FIG. 1 shows one possible application of the coupling of the present invention, namely a progressive cavity drilling apparatus using a progressive cavity drive train. This general structure is familiar to those skilled in the art. The apparatus includes a drill string 15, a progressive cavity drive train, a drill bit drive shaft 16 and a drill bit 26. The drive train of the present invention comprises a progressive cavity device and a sealed coupling for converting the motion of the rotor of the progressive cavity device, i.e., orbiting of the rotor and the rotational motion of the rotor, into rotation about a single axis at the same speed.

As illustrated in FIG. 1, the progressive cavity device A has a stator, a rotor, an outlet passageway 11 for fluid to enter between the stator and the rotor, and an outlet passageway 20 for the fluid to exit therefrom. In the drawings, the housing 10 and its flexible lining 14 are held against movement so that they function as the stator in the device A and the shaft 12 functions as the rotor. The housing 10 is tubular and its interior communicates with inlet 11 in the top portion of the lining 14 to provide a passageway for fluid to enter the progressive cavity device A. Outlet 20 in the bottom portion of the lining 14 serves as the passageway for fluid to discharge from the progressive cavity device A. The shaft 12 is precisely controlled so as to roll within the lining 14. The progressive cavity device A is attached to the lower end of a drill string 15.

The lower end of the rotor shaft 12 includes a shaft connection 18a. The shaft connection allows the rotor 12 to be directed to a stub shaft of the coupling (described below). The coupling is located in the lower part of the housing 10 and is not visible in FIG. 1.

The progressive cavity device of the present invention may function as a fluid motor or driving apparatus for driving the drilling apparatus shown in FIG. 1. If so, a pressurized fluid, typically water carrying suspended particles commonly referred to as "mud", is forced into the progressive cavity device. The rotor 12 responds to the flowing fluid to produce a rotor driving motion which is simultaneously a rotation, an oscillation, and a orbit. The coupling, described below, attached to the rotor 12 at connection point 18a and aligned with the true center of the rotor described above converts this rotor driving motion into rotational driving motion substantially about a single axis.

The progressive cavity device of the present invention may also function as a pump. If so, a rotatable driving shaft is coupled to the rotor by the articulated coupling described below. The driving shaft causes the rotor to roll within the cavity which provides a pumping action as is well known to those skilled in the art.

Figure 2:
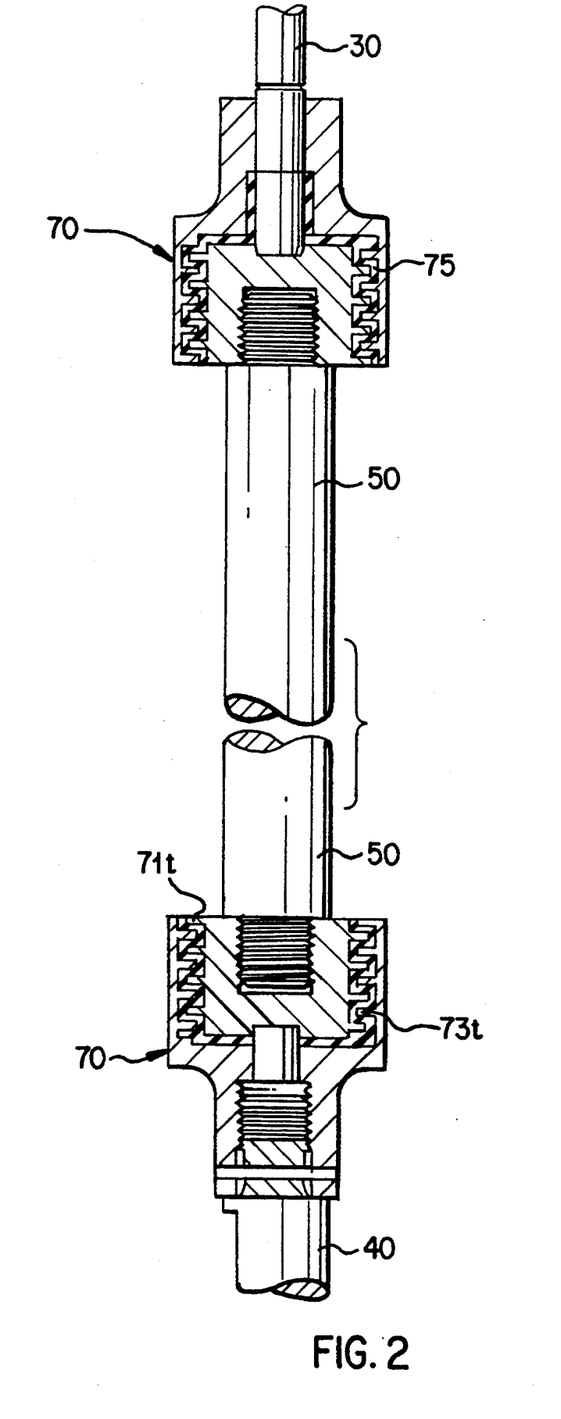
FIG. 2 is a side view, partially in section, of the coupling of the present invention.

FIG. 2 shows the general construction of the coupling of the present invention. Specifically, the coupling includes a first stub shaft 30, a second stub shaft 40, an intermediate shaft 50 and two elastomeric helical joint assemblies 70.

The elastomeric helical joint assemblies 70, described in greater detail below, connect the first stub shaft 30 to the intermediate shaft 50 at one end thereof and connect the second stub shaft 40 to the intermediate shaft 50 at the other end of the intermediate shaft 50.

The stub shafts 30, 40, each include a connection portion which allows the stub shafts to be connected to either the rotor 12 or the drill bit drive shaft 16 in the manner described above. A variety of connecting means including threads on the ends of the stub shaft, splines or the like could be employed. Additionally, as mentioned above, the stub shafts could be formed integrally with either the rotor shaft 12 or the drill bit drive shaft 16.

The end of the stub shafts opposite the end having the connecting portion is secured to the female portion 73 of the joint assembly 70. In the illustrated embodiment, the specific structure used is a shaft which extends into a sleeve formed as part of the helical joint assembly 70. This allows the stub shafts 30, 40 to be secured to the joint assemblies by means of one or more radially extending pins as shown in the lower part of FIG. 2. In this way, the stub shafts are securely connected to one end of the elastomeric helical joint assembly and, in effect, function as an integral part of that end of the elastomeric joint assembly. It is possible to form the stub shaft integrally with an end of the joint assembly. However, this might complicate manufacture.

The intermediate shaft 50 is similarly connected to the male portion 71 of joint assembly 70. Again, the intermediate shaft could be made integral with the portion of the joint assembly to which it is fixed, but this might complicate manufacture.

As detailed below, the couplings each include a male portion 71 and a female portion 73 which are interlocked and joined together by highly restrained helically extending rubber or some other elastomer bonded to both the male portion 71 and the female portion 73. Since the elastomer is compressible, the male and female portions may pivot to a limited degree with respect to an adjacent portion in any direction. Torque transmitted by the coupling tends to cause the male portion 71 to thread into the female portion 73. This causes compressions and shear of the elastomer. Since this compression and shear occurs over a large area, the torque and thrust capabilities of the coupling are exceptionally high. Moreover, in the unlikely event of a complete or partial failure of the elastomer under loading, the male and female portions are simply threaded together to avoid further damage to the pump or motor. Thus, the coupling is fail safe.

As noted above, the portions located at either end of the joint assembly are secured to a shaft (either a stub-shaft or the intermediate shaft) and the overall coupling assembly includes a stub shaft, a joint assembly, an intermediate shaft, another joint assembly and a second stub shaft. This overall assembly has flexibility somewhat similar to that of a conventional double Hooke's joint universal except that the direction of pivoting of the coupling portions with respect to one another is not limited as with a double Hooke's joint. Although this gives the coupling of the present invention somewhat greater flexibility, it could present a problem. Because the axes of pivoting of the coupling portions with respect to one another cannot be precisely controlled, the ability to eliminate cyclic variations in output speed can be lost. As noted above, one of the advantages of the double Hooke's joint is that the pivoted axes are arranged such that cyclic velocity variations at each universal joint are cancelled thereby giving a constant output speed. This result will not necessarily be obtained using a rubber coupling such as that disclosed herein wherein the pivoting within the coupling can be about any axis.

Although the coupling is not, strictly speaking, a double Hooke's joint, it is nevertheless expected that, as used in the present invention, the output will have a substantially constant velocity for at least two reasons. First, the angle of deviation of the shaft portions used in the present invention is typically less than 5°. As noted above, as the angle of deviation approaches 0° the velocity variation becomes minimal or even insignificant. Further, because the two joint assemblies used are identical, but spaced, they will tend to operate out of phase such that any minimal velocity variations will be cancelled out. If it is critical to avoid any velocity variation whatsoever, the joint assemblies could be forced to operate out of phase for this purpose. However, this is not believed necessary for downhole drilling or pumping because absolute constant velocity is not required.

The construction of the elastomeric joint assembly 70 will now be described in greater detail with reference to FIGS. 2, 2A and 4–6. In these drawings, an elastomer 75 fills the spaces between and is bonded to the respective portions 71 and 73 of the joint assembly. In accordance with the present invention, the elastomer fills all the voids between the respective portions 71, 73 and other components such that there are no sliding surfaces within the joint assembly and the relatively moving portions are perfectly isolated so that the joint assembly itself is perfectly isolated from the surrounding environment. Further, because the elastomer is bonded to the annular extensions and because the portions are interlocked, the respective portions are securely connected to one another.

Figure 2A:
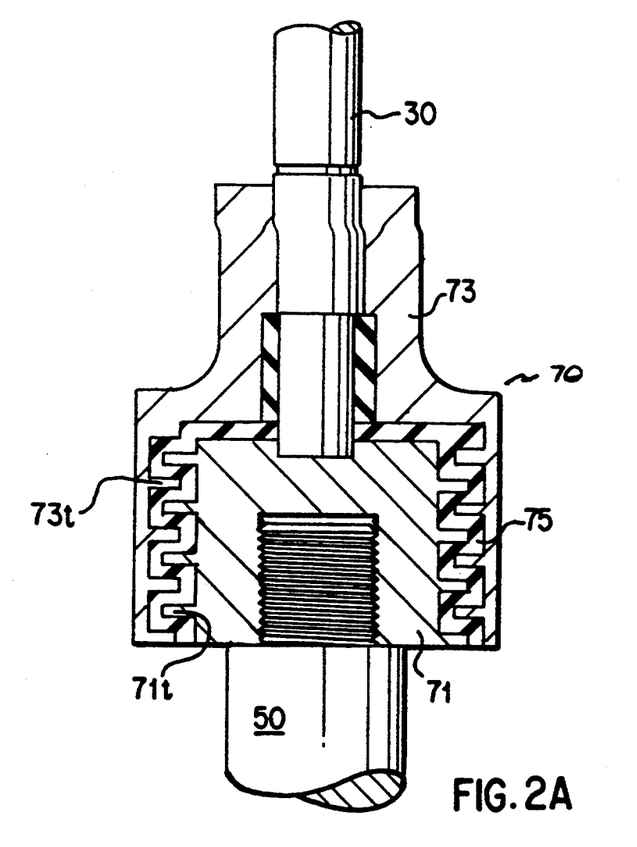
FIG. 2A is a detail view, partially in section, of the joint assembly used in the coupling of FIG. 2.

As best shown in FIG. 2A, the elastomeric joint assembly 70 includes a male threaded portion 71 a female threaded portion 73. The male threaded portion 71 is spaced from the female threaded portion 73 so as to define a tortuous helical space. The helical space is filled by an elastomer which is bonded to both the male and female threaded portions. Because of the interlocking nature of the male and female threaded portions, the elastomer or rubber 75 is highly restrained. Each of the portions 71 and 73 are formed of a rigid, high strength, material such as high strength 4140 steel or the like.

Figure 4:
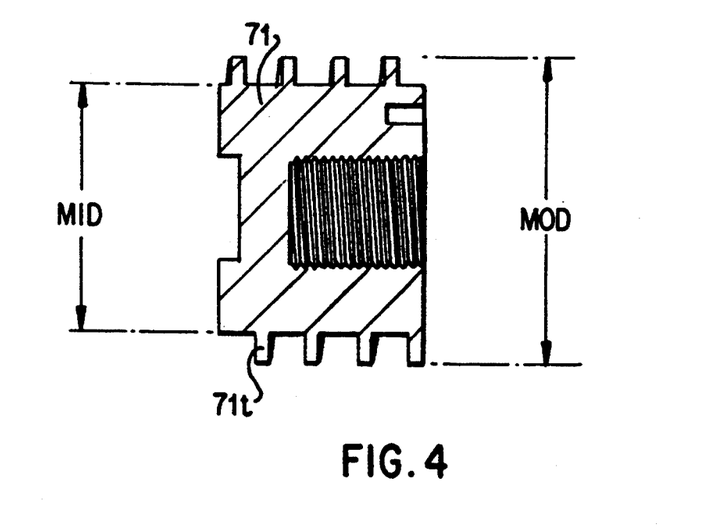
FIG. 4 is a sectional view of the male threaded member of the joint assembly used in the coupling of FIG. 2.
Figure 5:
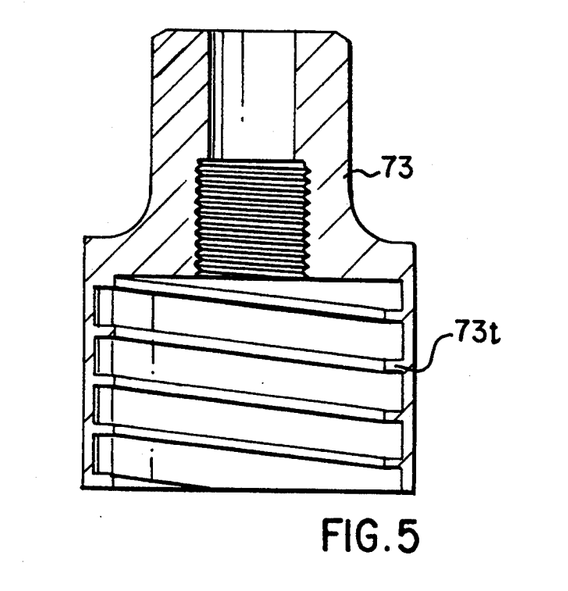
FIG. 5 is a sectional view of one female member of the joint assembly shown in FIG. 2.
Figure 6:
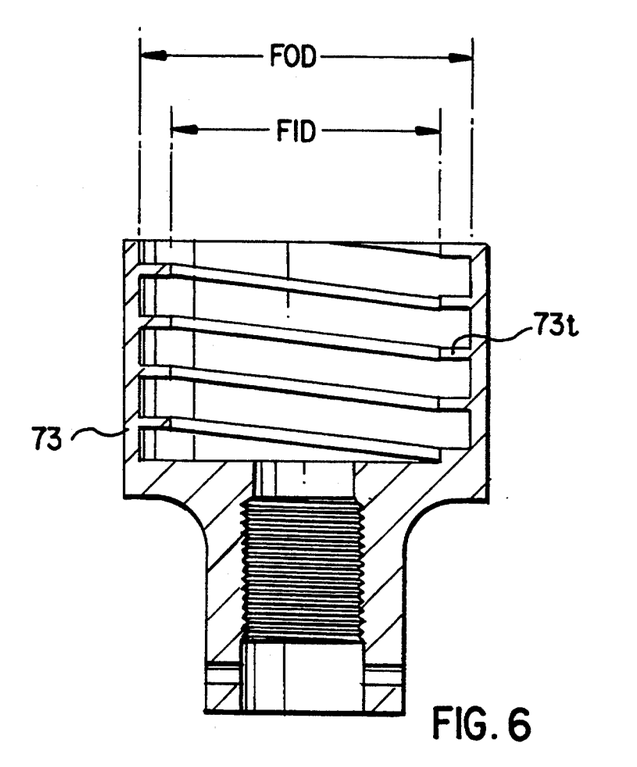
FIG. 6 is a sectional view of another female member of the joint assembly used in the coupling shown in FIG. 1.

As best shown in FIG. 2 and detailed in FIGS. 4–6, each helical elastomeric joint assembly 70 includes a male threaded member 71, a female threaded member 73 and an elastomer 75 separating and bonded to the male threaded member 71 and the female threaded member 73.

The male threaded member 71 is connected to either the intermediate member 50 or the stub shaft 30, 40. The female threaded member 73 is connected to the other of the stub shaft 30, 40 and the intermediate member 50.

The male threaded member 71 is formed with a helical male thread 71t having a diameter MID and an outer diameter MOD as best shown in FIG. 4. The female threaded member 73 is formed with a helical female thread 73t having an inner diameter FID and an outer diameter FOD as best shown in FIG. 6. The inner diameter FID of the female helical thread 73t has a value which is substantially between the inner diameter MID and the outer diameter MOD of the male thread 71t. In addition, the outer diameter FOD of the female thread 73 exceeds the outer diameter MOD of the male thread 71t. Thus, the male member 71 can be threaded into the female member 73 while a space is provided between male helical thread 71t and the female helical thread 73t so that the female helical thread 73t and the male helical thread 71t are spaced from one another. Naturally, it is preferable that the male helical thread 71t and the female helical thread 73t have the same pitch.

The elastomer 75 is bonded to both the male member 71, including the thread 71t and the female member 73 including the thread 73t. Because of the interlocking nature of the male and female threads provided by the dimensional relationships between the outer diameters and inner diameters, the elastomer 75 follows a tortuous helical path and is highly restrained. The provision of the elastomer 75 gives the joints sufficient flexibility to accommodate the bending necessary for downhole drilling. On the other hand, any loads passing through the coupling are transmitted through the elastomer 75. Thrust loads are transmitted longitudinally through the coupling by compression of the elastomer. Since the elastomer is relatively highly restrained in a longitudinal direction, such loads are easily passed through the coupling. Torque loading, on the other hand, results in both compression and shear forces on the elastomer 75 by virtue of the threading of the male member relative to the female member. More specifically, a torsional load on the coupling causes threading of the male helical thread into the female helical thread compressing the elastomer to the point where it becomes substantially incompressible so as to prevent transmission of torque. Since the elastomer is bonded to both male helical thread 71t and the female helical thread 73t, such movement requires shearing of the elastomer. Because of the helical construction of the elastomer 75, the length of the elastomer being sheared is dramatically increased. This provides the coupling with a dramatically improved torque capability. Moreover, the coupling is fail safe since even if the elastomeric connection fails the male and female portions will simply thread together.

In a preferred embodiment of the present invention, for example, the outer diameter FOD of the female thread is 3.3 inches and the inner diameter FID of the female thread is 2.7 inches. The outer diameter MOD of the male helical thread 71t is 2.7 inches and the inner diameter MID of the male helical thread 71t is 2.4 inches. Considering the relative nature of these values, it can be easily appreciated how the male helical members are interlocked but yet spaced from one another so as to provide tortuous helical path which is filled by the elastomer bonded to the male and female members to allow transmission of load but at the same time permitting sufficient bending. Another advantage of the coupling shown is that the surfaces between the male member 71 and the female member 73 are perfectly isolated by the elastomers such that the joint is not subject to significant wear or erosion due to the contamination typically found downhole.

In the assembled state as shown in FIG. 2, an annular space remains between each of the interlocked male and female threaded portions as well as a longitudinal space between the ends of male threaded portions and the adjacent portion of the female threaded member. In accordance with the present invention, the spaces between the portions 71 and 73 of the joint assembly are filled with an elastomer such as rubber which is bonded to the surface of the portions 71 and 73. The elastomer completely fills the spaces. Because these spaces are relatively narrow in the radial direction, the elastomer which fills these spaces is highly restrained. As is known, when elastomer such as rubber is highly restrained as in the joint assembly of the present invention, the elastomer becomes virtually incompressible in the longitudinal direction. Thus, the joint assembly including the portions 71 and 73 and the elastomer between these portions is essentially incompressible in the longitudinal direction. However, because the elastomer is not so highly restrained for threading type movement, the joint is still flexible in shear. Consequently, the portions 71 and 73 have some degree of flexibility with respect to their adjacent portions in all radial directions.

In operation, the flexibility of the portions 71 and 73 of the elastomeric joint assemblies 70 allow a Hooke's joint type motion between the shafts connected by the joint assembly. Of course, as noted above, there is some additional flexibility owing to the fact that the respective portions 71 and 73 of the joint assembly can pivot with respect to one another in any direction. The provision of two such joint assemblies and the intermediate shaft 50 between the two stub shafts 30 and 40 makes it possible for the coupling to resolve complex motion of the rotor 12 into simple rotation of the drill bit drive shafts 16.

Thus, it can be appreciated that the use of the elastomeric joint assemblies between the respective stub shafts and the intermediate shaft allows a resolution of the complex rotor motion into simple rotation of the drill bit drive shaft in a hermetically sealed environment. This solves the problems experienced in the prior art which employ non-hermetically sealed universal assemblies.

Finally, it should be understood that the joint assembly described herein can also be used with a progressive cavity drive train that is used as a pump. Such devices using the joint assembly of the present invention can be designed to have an extremely small diameter. Among the many advantages of the present invention are: high torque and thrust capability resulting from the large area over which shear occurs; a fail safe construction whereby the male and female threaded portions thread themselves together in the absence of elastomer; complete isolation of the moving parts to eliminate sliding and consequent wear (resulting in improved durability); and deflection occurs with relatively little force.

What is claimed is:

1. A progressive cavity device comprising:
    a housing structure;
    a stator, the stator having a longitudinal axis;
    a rotor having a true center, the rotor being located within the stator;
    the stator and the rotor each having coacting helical lobes which are in contact with one another at any transverse section, the stator having one more helical lobe than the rotor such that a plurality of cavities are defined between the rotor and the stator, and the rotor being adapted to rotate within the stator such that the true center of the rotor orbits the axis of the stator, the orbit having a predetermined radius and the orbiting motion of the rotor causing a progression of the cavities in the direction of the axis of the stator;
    a first stub shaft having a longitudinal axis and first and second longitudinal ends, the first end of the first stub shaft being connected to and movable with the rotor;
    a first joint assembly fixed to the second end of the first stub shaft; the joint assembly comprising a male threaded portion having a helical thread formed therein and a female threaded portion having a helical thread formed therein, the male threaded portion being threaded into the female threaded portion such that the helical threads are interlocked but spaced from one another; and an elastomer filling the space between the interlocked helical threads so that the male threaded portion and female threaded portions are pivotable with respect to one another;

an intermediate shaft having first and second ends, the first end being fixed to the first joint assembly;

a second joint assembly having first and second ends, the first end of the second joint assembly being connected to the second end of the intermediate shaft, the second joint assembly comprising a male threaded portion having a helical thread formed therein and a female threaded portion having a helical thread formed therein, the male threaded portion being threaded into the female threaded portion such that the helical threads are interlocked but spaced from one another; and an elastomer filling the space between the interlocked helical threads so that the male threaded portion and female threaded portions are pivotable with respect to one another;

a second stub shaft having a longitudinal axis which is substantially collinear with the axis of the stator and first and second longitudinal ends, the second stub shaft being rotatably mounted about its longitudinal axis within the housing structure, the first end of the second stub shaft being fixed to the second end of the second joint assembly, the second end of the second stub shaft being connected to a rotatable shaft; and whereby the first and second stub shafts are coupled such that in response to the flow of fluid through the stator the first stub shaft can rotate about its axis and orbit about the axis of the second stub shaft at the same time the second stub shaft rotates about its longitudinal axis so as to cause rotation of the drill bit drive shaft.

2. The device train of claim 1, wherein the first stub shaft is integrally formed as one piece with the rotor.

3. The device of claim 1, combined with a drill bit operatively connected to and driven by the shaft such that the device is adapted to operate as a drive train.

4. The device of claim 1, combined with a motor for driving the shaft such that the device is adapted to operate as a pump.

5. The device of claim 1, wherein the elastomer is bonded to the male and female threaded members.

6. The progressive cavity device of claim 1, wherein both the first joint assembly and the second joint assembly are constructed such that the male threaded portion can be threaded into the female threaded portion in response to torsional loads.

7. The progressive cavity device of claim 1, wherein the first and second joint assemblies are spaced from one another such that the male threaded portion of the first joint assembly is movable with respect to the male threaded portion of the second joint assembly.

8. A progressive cavity device comprising:
a stator having a longitudinal axis;
a rotor within the stator, the rotor having a true center, the rotor being adapted to rotate and orbit about the axis of the stator;
a coupling having first and second ends, a first stub shaft at the first end and a second stub shaft at the second end, and an intermediate shaft located between the first and second stub shafts, the intermediate shaft being connected at one distal end thereof to the first stub shaft via a first joint assembly and the intermediate shaft being connected at the other distal end thereof to the second stub shaft via a second joint assembly;

each of the joint assemblies comprising a male threaded member and a female threaded member, wherein the male threaded member is formed with a helical male thread having an inner diameter and an outer diameter, the female threaded member is formed with a helical female thread having an inner diameter and an outer diameter, and the inner diameter of the female helical thread lies substantially between the inner and outer diameter of the male thread and the outer diameter of the female thread exceeds the outer diameter of the male thread such that the male member can be threaded into the female member while a space is provided between the male helical thread and the female helical thread so that the female helical thread and the male helical thread are spaced from one another so as to define a helical space; and an elastomer filling the helical space between the male and female helical threads and the elastomer being bonded to the male helical thread and the female helical thread;

wherein the first stub shaft of the coupling is attached to the rotor and has its axis aligned with the true center of the rotor for rotation therewith.

9. The progressive cavity device of claim 8, wherein both the first joint assembly and the second joint assembly are constructed such that the male threaded portion can be threaded into the female threaded portion in response to torsional loads.

10. The progressive cavity device of claim 8, wherein the first and second joint assemblies are spaced from one another such that the male threaded portion of the first joint assembly is movable with respect to the male threaded portion of the second joint assembly.

11. A progressive cavity train, the progressive cavity drive train comprising:
a stator, the stator having a longitudinal axis;
a rotor having a true center, the rotor being located within the stator; the stator and the rotor each having coacting helical lobes which are in contact with one another at any transverse section, the stator having one more helical lobe than the rotor such that a plurality of cavities are defined between the rotor and the stator, and the rotor being adapted to rotate within the stator such that the true center of the rotor orbits the axis of the stator, the orbit causing a progression of the cavities in the direction of the axis of the stator;
a first stub shaft having opposed longitudinal ends, the first stub shaft being secured at one longitudinal end thereof to the rotor for movement therewith;
a first joint assembly having opposed longitudinal ends, the opposed longitudinal ends of the first joint assembly being pivotable with respect to one another and one of the longitudinal ends of the joint assembly being secured to the first stub shaft for movement therewith;
an intermediate shaft having first and second longitudinal ends, the first longitudinal end of the intermediate shaft being secured to the second longitudinal end of the first joint assembly for movement therewith, the first joint assembly thereby connecting the first stub shaft to the intermediate shaft for pivotable movement;

a second joint assembly having first and second longitudinal ends, the first and second longitudinal ends of the second joint assembly being pivotable with respect to one another, the first longitudinal end of the second joint assembly being secured to the second longitudinal end of the intermediate shaft for movement therewith;

a second stub shaft having first and second longitudinal ends, the first longitudinal end of the second stub shaft being connected to the second longitudinal end of the second joint assembly for movement therewith such that the second joint assembly connects the intermediate shaft to the second stub shaft for pivoting movement;

wherein the first joint assembly and the second joint assembly each include a male threaded portion and a female threaded portion, the male threaded portion being threaded into the female threaded portion and spaced from the female threaded portion by an elastomer so that the male and female threaded portions are pivotable with respect to one another.

12. The drive train of claim 11, wherein the male threaded member is formed with a helical male thread having an inner diameter and an outer diameter;

the female threaded member is formed with a helical female thread having an inner diameter and an outer diameter, the inner diameter of the female helical thread lies substantially between the inner and outer diameter of the male thread and the outer diameter of the female thread exceeds the outer diameter of the male thread such that the male member can be threaded into the female member while a space is provided between the male helical thread and the female helical thread so that the female helical thread and the male helical thread are spaced from one another so as to define a helical space; and the elastomer filling the helical space between the male and female helical threads and the elastomer being bonded to the male helical thread and the female helical thread.

13. The progressive cavity drive train of claim 11, wherein both the first joint assembly and the second joint assembly are constructed such that the male threaded portion can be threaded into the female threaded portion in response to torsional loads.

14. The progressive cavity drive train of claim 11, wherein the first and second joint assemblies are spaced from one another such that the male threaded portion of the first joint assembly is movable with respect to the male threaded portion of the second joint assembly.

15. A progressive cavity device comprising:
a housing structure;
a stator, the stator having a longitudinal axis;
a rotor having a true center, the rotor being located within the stator; the stator and rotor being arranged with respect to one another such that a plurality of cavities are defined between the rotor and the stator, and the rotor being adapted to rotate within the stator such that the cavities between the rotor and stator progress in the direction of the axis of the stator;

a rotatable shaft mounted within the housing for rotation about a predetermined axis, the shaft having first and second longitudinal ends;

a flexible coupling having first and second longitudinal ends, the first longitudinal end of the flexible coupling being connected to the rotor and the second longitudinal end of the flexible coupling being connected to the first end of the rotatable shaft, the flexible coupling comprising a first stub shaft having first and second longitudinal ends, a second stub shaft having first and second longitudinal ends and an intermediate shaft having first and second longitudinal ends, the second longitudinal end of the first stub shaft being pivotably connected to the first longitudinal end of the intermediate shaft and the first longitudinal end of the second stub shaft being pivotably connected to the second longitudinal end of the intermediate shaft; and wherein the pivotable connection between the first stub shaft and the intermediate shaft and the second stub shaft and the intermediate shaft is provided by a joint assembly, each such joint assembly comprising a male threaded member having a male thread and a female threaded member having a female thread, the female helical thread and the male helical thread being spaced from one another by an elastomer located between the male and female helical threads the elastomer being bonded to the male helical thread and the female helical thread, whereby normal torque loading causes the male threaded member to thread itself into the female threading member thereby compressing the elastomer.

16. A coupling comprising: a first stub shaft having first and second longitudinal ends; a second stub shaft having first and second longitudinal ends and an intermediate shaft having first and second longitudinal ends; the second longitudinal end of the first stub shaft being pivotably connected to the first longitudinal end of the intermediate shaft and the first longitudinal end of the second stub shaft being pivotably connected to the second longitudinal end of the intermediate shaft; and wherein the pivotable connection between the first stub shaft and the intermediate shaft and the second stub shaft and the intermediate shaft is provided by a joint assembly which includes a male threaded portion and a female threaded portion, the male threaded portion being threaded into and spaced from the female threaded portion, and a compressible elastomer filling the space between the male threaded portion and the female threaded portion so that the male threaded portion is pivotable with respect to the female threaded portion.

17. The coupling of claim 16, wherein:

the male threaded member is formed with a helical male thread having an inner diameter and an outer diameter, the female threaded member is formed with a helical female thread having an inner diameter and an outer diameter, the inner diameter of the female helical thread lies substantially between the inner and outer diameter of the male thread and the outer diameter of the female thread exceeds the outer diameter of the male thread such that the male member can be threaded into the female member while a space is provided between the male helical thread and the female helical thread so that the female helical thread and the male helical thread are spaced from one another so as to define a helical space; and the compressible elastomer filling the helical space between the male and female helical threads and the elastomer being bonded to the male helical thread and the female helical thread.

18. The coupling of claim 16, in combination with a progressive cavity pump having a rotor and stator and a motor for driving the pump, whereby the coupling transmits rotation of the motor into orbiting and rotation of the pump rotor.

19. The coupling of claim 16, wherein both the first joint assembly and the second joint assembly are constructed such that the male threaded portion can be threaded into the female threaded portion in response to torsional loads.

20. The coupling of claim 16, wherein the first and second joint assemblies are spaced from one another such that the male threaded portion of the first joint assembly is movable with respect to the male threaded portion of the second joint assembly.

* * * * *